N. B. MITCHELL, J. W. TAGGART, Sr. & U. G. REDELMANN.
PORTABLE SAWING MACHINE.
APPLICATION FILED JULY 14, 1913.
1,195,945.
Patented Aug. 22, 1916.
3 SHEETS—SHEET 1.
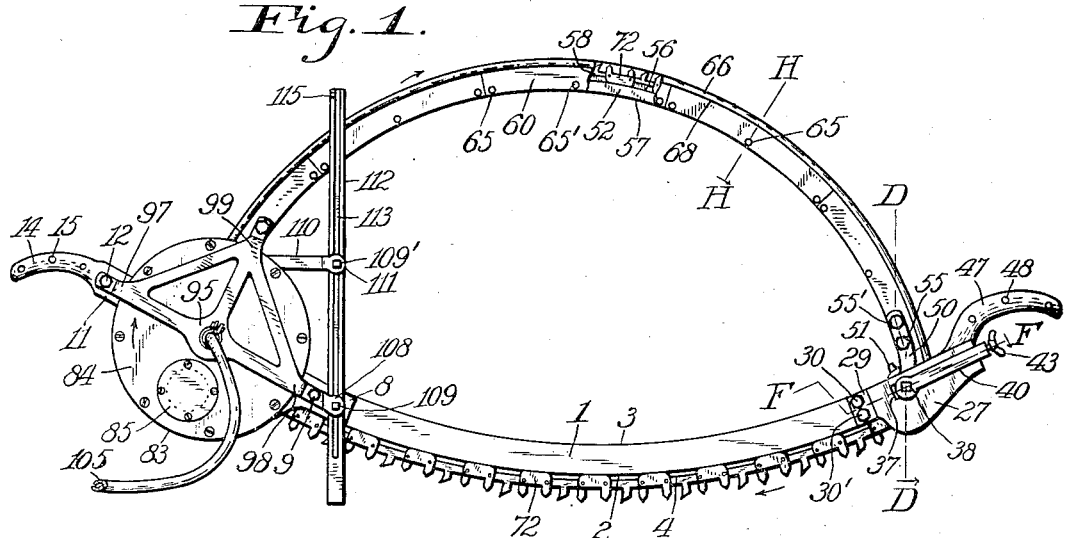
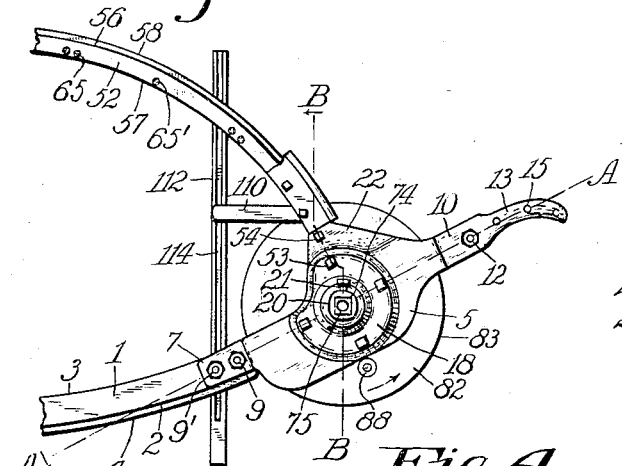
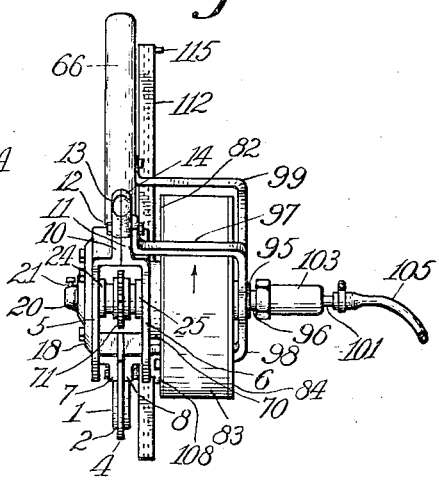
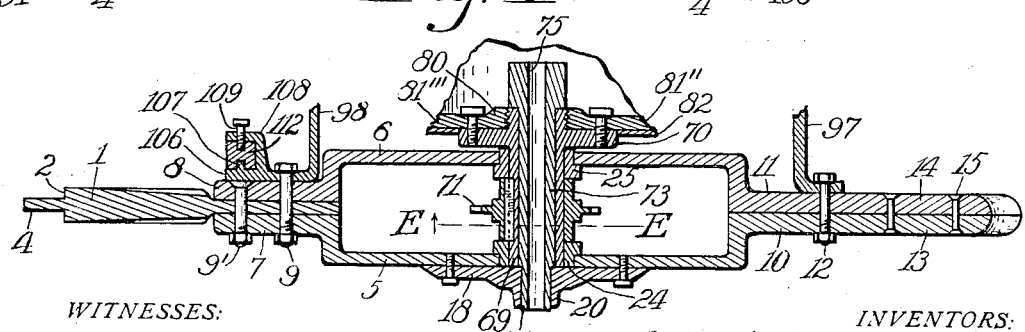
WITNESSES:
J. H. Gardner.
Marie Wuelfing.
INVENTORS:
N. B. Mitchell, J. W. Taggart, Sr.,
and U. G. Redelmann,
By E. T. Silvius,
ATTORNEY.

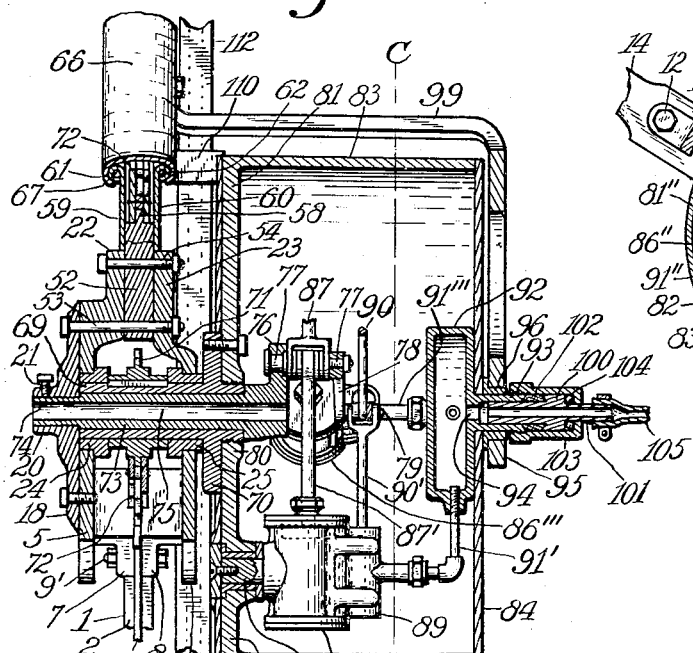
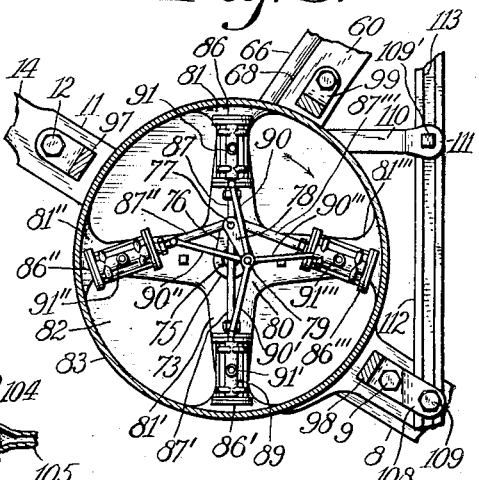
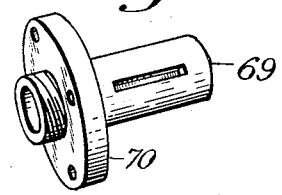
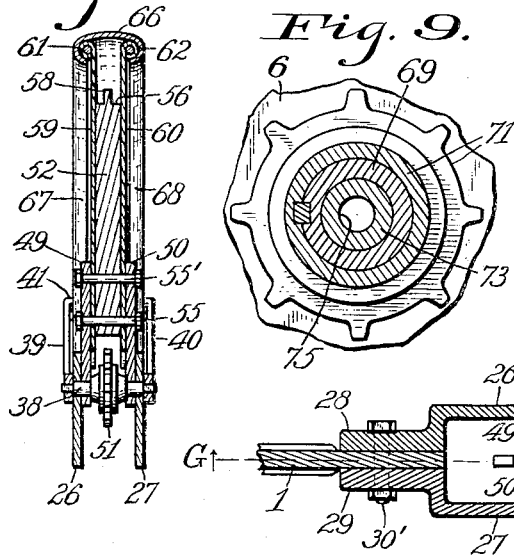
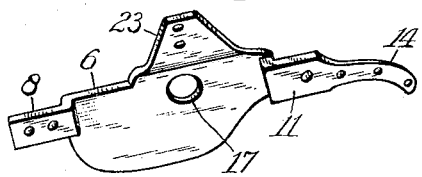
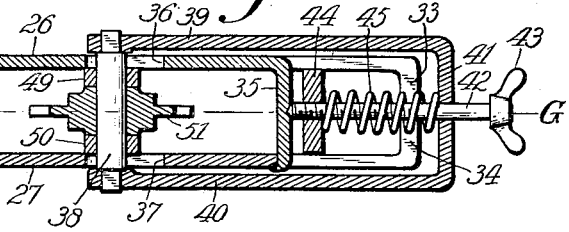

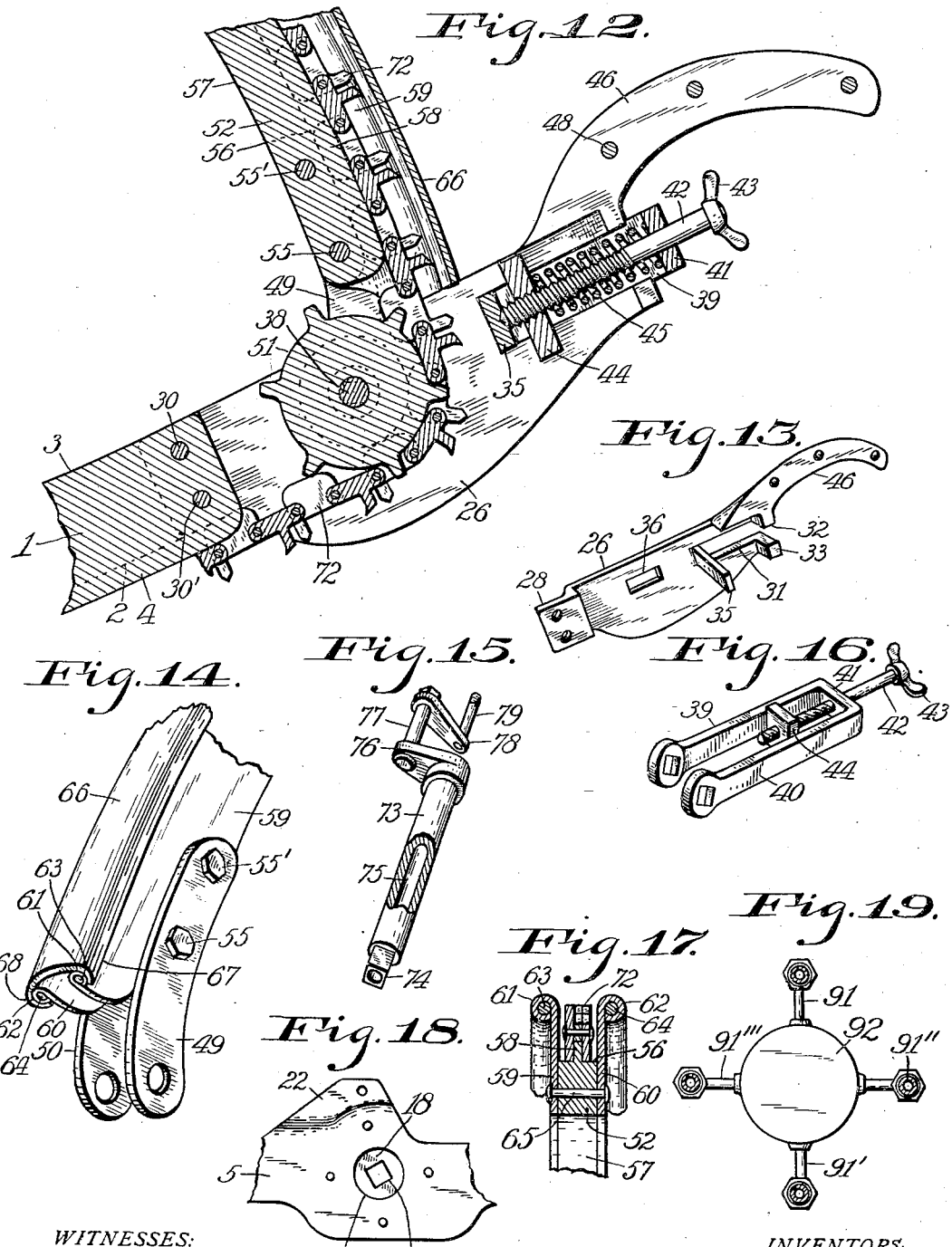

UNITED STATES PATENT OFFICE.

NELSON B. MITCHELL, JOHN W. TAGGART, SR., AND ULRICH G. REDELMANN, OF INDIANAPOLIS, INDIANA.

PORTABLE SAWING-MACHINE.

1,195,945.  Specification of Letters Patent.  Patented Aug. 22, 1916.

Application filed July 14, 1913. Serial No. 778,931.

*To all whom it may concern:*

Be it known that we, NELSON B. MITCHELL, JOHN W. TAGGART, Sr., and ULRICH G. REDELMANN, citizens of the United States, residing at Indianapolis, in the county of Marion and State of Indiana, have invented a new and useful Portable Sawing-Machine, of which the following is a specification, reference being had to the accompanying drawings, and to the letters and figures of reference marked thereon.

This invention relates to sawing machines of the type that is adapted more especially for use in forests, particularly for cutting down trees and for sawing the trunks of the trees into suitable lengths to form logs, the invention having reference more particularly to a frame and operating mechanism for a chain saw.

An object of the invention is to provide a light weight portable sawing machine of such construction as to be suitable to be carried about and readily handled in operation by two men, in order to economize in the matter of time and wages of employees.

A further object is to provide a portable sawing machine of simple and inexpensive construction, and which shall be strong and durable in use.

A still further object is to provide improved means for driving and controlling chain saws in connection with portable frames.

With the above mentioned and other objects in view, the invention consists in an improved sawing machine comprising an improved elliptical frame, constituting a guide and a guard for a chain saw, and having an engine or motor mounted thereon for driving the saw, the engine being of such construction that the necessary frame thereof constitutes a fly-wheel, in order that the advantages, without the weight of a separate balance-wheel, may be obtained.

The invention consists also in the novel parts and in the combinations and arrangements of parts as hereinafter particularly described and further defined in the accompanying claims.

Referring to the drawings, Figure 1 is a plan or front view of the improved sawing machine, considered as being in horizontal position for sawing standing trees; Fig. 2, a fragmentary inverted plan; Fig. 3, an end elevation of the machine as when in upright position for sawing a horizontal log; Fig. 4, a fragmentary section approximately on the line A A in Fig. 2; Fig. 5, a section approximately on the line B B in Fig. 2; Fig. 6, a section on the line C C in Fig. 5; Fig. 7, a section on the line D D in Fig. 1; Fig. 8, a perspective view of one of the parts of the driving mechanism; Fig. 9, a fragmentary section on the line E E in Fig. 4; Fig. 10, a perspective view of one of the parts of the head stock of the frame; Fig. 11, a fragmentary section approximately on the line F F in Fig. 1; Fig. 12, a sectional elevation of the tail stock of the frame on the plane of the line G G in Fig. 11; Fig. 13, a perspective view of one of the parts of the tail stock; Fig. 14, a fragmentary perspective view of the chain guard; Fig. 15, a perspective view of one of the parts of the driving mechanism; Fig. 16, a perspective view of parts of an improved chain adjuster; Fig. 17, a fragmentary section on the line H H in Fig. 1; Fig. 18, a fragmentary detail showing parts of the head stock, and Fig. 19, a fragmentary section on the line C C in Fig. 5, looking toward the right-hand side.

In the different figures of the drawings, like reference characters indicate like parts or features of construction hereinafter referred to in detail.

The frame of the improved sawing machine, as preferably constructed, comprises a curved guide bar or backing blade 1, the bar or blade having a convex outer face 2, for guiding a chain saw longitudinally, the bar having an inner concave edge 3, and a guide rib 4 that projects from the convex face for laterally guiding the saw. An improved head stock comprises two similarly formed plates 5 and 6, having set-in end portions 7 and 8, respectively, that are secured to opposite sides of the guide bar 1, by means of bolts 9 and 9'. The plates have opposite end portions 10 and 11, that are set in each toward the other and secured together by means of a bolt 12, and they have handle portions 13 and 14 thereon respectively, that are secured together by rivets 15. The plates 5 and 6 have apertures 16 and 17 therein respectively, to receive parts of the driving mechanism, and the outer side of the plate 5 has a reinforcing member 18 secured thereto that has a squared hole or socket 19 therein, somewhat less in diameter than the aperture 16, the outer side of said member having a projecting boss 20 thereon that is provided with a set-screw 21 that extends to the squared hole. The plates 5 and 6 extend away from the end of the bar 1, and have lateral projections 22 and 23 thereon that are set over each toward the other. Suitable bushings comprising bearing boxes 24 and 25 are secured in the apertures in the plates 5 and 6, respectively, for supporting a shaft, as will further appear.

An improved tail-stock comprises two similarly shaped plates 26 and 27 having set-in end portions 28 and 29, respectively, that are secured to the opposite end portion of the bar 1, by means of bolts 30 and 30', the plates extending outward beyond the end of the bar, and the outer end portion of each plate has a longitudinal slot 31 therein and also lateral end stops 32, 33, the plate 27 having also an end stop 34. The plate 26 has a cross bar 35 fixed thereon at the inner end of the slot, and it is connected to the opposite plate 27. The middle portions of the plates 26 and 27 have longitudinal guideways 36 and 37 therein, respectively, in which an axle 38 is slidingly arranged and connected at its ends to a yoke comprising two rods 39 and 40 which preferably are fixedly secured to the axle, and are connected to a cross-bar 41 that is normally opposite the end stops 33 and 34 and has a screw-threaded adjusting rod 42 rotatably mounted therein and provided with an operating lever 43, the rod extending through a nut 44 that is guided between the two plates 26 and 27 and thereby prevented from rotating, the rod 42 extending to the cross-bar 35. A coil spring 45 is guided on the rod 42 and seated on the cross-bar 41 of the yoke and also seated on the nut 44, so that the axle may be drawn yieldingly toward the cross-bar 35 by means of the adjusting rod 42. The plates 26 and 27 have curved handle members 46 and 47 thereon that are secured together by rivets 48. Two connecting rods 49 and 50 are connected to the axle 38 at the inner sides of the plates 26 and 27 respectively, and a sprocket wheel 51 is rotatably mounted on the middle portion of the axle 38. A bow-shaped or semi-elliptical frame member 52 is secured at one end to the projections 22 and 23 of the head-stock by means of bolts 53 and 54, its opposite end portion being secured to the connecting rods 49 and 50 by means of bolts 55 and 55'. The frame member 52 has an outwardly facing convex guide side 56 and also a concave side or edge 57 that is presented toward the concave edge 3 of the guide bar 1, the guide side 56 having a guide rib 58 thereon for guiding the chain saw. In order to guard the chain saw, the member 52 is provided with side plates 59 and 60, which preferably are made in sections and have beads or ribs 61 and 62 on their outer edges that are turned over bead wires 63 and 64 respectively, the plates being secured to the member by screws or rivets 65 and 65', so that the plates extend outward beyond the outer portion of the member. A single curved cover plate 66 has inwardly turned clasping edges 67 and 68 that embrace the beads or ribs 61 and 62 and may be disconnected therefrom by moving the plate endwise through the space between the plates 5 and 6 of the head-stock.

Improved gearing for actuating the saw comprises a hollow shaft 69, having a flange or wheel 70 thereon, the shaft being rotatably mounted in the bearings 24 and 25, and a sprocket wheel 71 fixedly secured to the shaft between the bearings, the flange or wheel being arranged opposite the outer side of the plate 6. A chain saw 72, which may be of any suitable or desired construction, is arranged so as to extend about the driving wheel 71 and the guide wheel 51 and also along the faces 2 and 56 of the guide bars respectively, the blocks connected with the links of the saw being adapted to clear the guide ribs 4 and 58, that portion of the chain saw that is guided by the member 52 being covered by the guard that is connected to said member. A crank-shaft 73 is inserted in the hollow shaft 69 and extends therethrough, and it has a squared end portion 74 that extends into the squared hole or socket and is secured therein by the set screw 21, so that the crank shaft cannot rotate but permits the hollow shaft 69 to rotate thereon. The crank shaft 73 has an exhaust port 75 extending therethrough for the escape of exhaust steam or air from the engine, which will be hereinafter described. The crank-shaft has a crank arm 76 on its opposite end and is provided with a crank pin 77, to which a return crank 78, provided with a crank pin 79, is secured, or integrally formed therewith, the crank pin 79 being arranged eccentrically to the axis of the crank-shaft. A hub 80 is fixedly secured to the hollow shaft 69 and has arms 81, 81', 81'' and 81''' thereon that are secured to the flange or wheel 70, a web plate 82 being suitably secured to the arms and extending from the flange outward to the ends of the arms, a cylindrical casing 83 being connected to the ends of the arms to constitute a portion of a housing which is provided with a cover plate 84 suitably secured to the casing 83, and preferably provided with a hand-hole plate 85. A suitable number of engine cylinders 86, 86', 86'' and 86''' are suitably mounted to oscillate on the respective arms or base structure of the housing, the cylinders being of well known construction and obviously having pistons therein provided with rods 87, 87', 87'' and 87''', all connected to the crank pin 77, each cylinder preferably having a centrally arranged trunnion 88 on its side that is rotatably mounted in the base portion of the housing, as seen particularly in Fig. 5, the opposite portion of each cylinder having a suitable valve chest 89 thereon. The valve chests and controlling valves therein are not specifically included as parts of the present invention, and may be variously constructed in detail, brief mention thereof being sufficient to an understanding of the invention. The valve chests are cylindrical, as preferably constructed, and have open ends, the valves being of the double piston type, adapted to receive the actuating fluid between the pistons, and controlling the admission and exhaust thereof through suitable ports to the cylinder, the exhaust escaping from the ports at the outer sides of the pistons and through the open ends of the valve chest into the closed housing of the engine. The controlling valves have knuckled valve stems 90, 90', 90'' and 90''', respectively, that are connected to the eccentrical crank pin 79, so that the valves are properly controlled when the cylinders are carried around the crank pin 77 which, as will be seen, is stationary.

In order to supply the actuating fluid, preferably steam, to the engine, four suitably swiveled branch pipes 91, 91', 91'' and 91''' are connected to the valve chest of the four cylinders respectively, and are connected to a hollow header 92, that is arranged at the inner side of the cover 84 of the housing, the header having a shaft or shank 93 through which an inlet duct 94 extends, the shank extending through the cover and also through a journal bearing 95, preferably provided with a journal box 96, in which the shank may rotate as a spindle and assist in steadying the housing. The journal bearing 95 is supported by an arm 97 secured to the bolt 12, an arm 98 secured to the bolt 9 and an arm 99 secured to the guide bar or frame member 52. A suitable hollow shaft 100 is arranged to turn in the shank 93 and has an enlarged middle portion from one side of which extends an inlet portion 101, suitable packing 102 being placed between the enlarged portion and the end of the shank 93, the packing being retained by means of a cap 103 screwed onto the shank, the inlet portion 101 extending through the head of the cap. The cap rotates with the housing, and bearing balls 104 are placed between the head of the cap and the enlarged portion of the hollow shaft 100. A flexible supply pipe or steam hose 105 is connected to the inlet portion 101 for conducting the actuating fluid from any desired source to the engine.

In order to resist the tendency of the saw, when in operation, to draw the saw frame in the direction opposite to that in which the saw moves, an improved stop bar is provided and adjustably mounted in connection with a suitable guide 106, which preferably is formed as an extension of the arm 98, and is provided with a guide projection 107 and also an opposing guide finger 108, provided with a screw 109 which serves as a set-screw and also as a guide opposite to the projection 107. A guide bar 110 is secured to the frame member 52, adjacent to the head-stock, and it has a guide finger 111 provided with a screw 109'. A stop bar 112 is provided which has a longitudinal groove 113 in one side and a similar groove 114 in the opposite side thereof to receive the projections 107 and ends of the screws 109 and 109', whereby the bar is adjustably and also movably guided, the bar being secured against movement when desired, by means of the screws, or when the screws are slackened the bar may slide longitudinally, and is stopped in its downward movement when sawing horizontal logs by a projection 115, fixed on the upper portion of the bar.

It will be understood that, although the steam engine is preferable for the purpose, other types of motors may be mounted in the engine housing so as to guard against injury to the operator, and be connected to the housing and also to the crank-shaft, so that the housing, while serving as a guard, also performs the function of a fly-wheel. Also various modifications in the details of construction may fairly be made within the scope of the appended claims.

In practical use the saw frame is handled and controlled by an operator and an assistant, who conveniently grasp the handles and also the guarded frame member 52. The engine is run at high speed so that the saw performs rapid work, but inasmuch as the saw follows curved guides, it is not liable to run loose as when it is guided on a straight backing blade, when the centrifugal force is inclined to throw the chain saw outward from the backing blade and also from portions of the saw frame when made straight with angles. The engine being in motion, the operators carry the saw frame horizontally and place the chain saw against a standing tree, the stop bar 112 being projected beyond the saw so as to be in contact with the side of the tree, which is rapidly cut down, and the operation may be repeated on other trees. When the timber is lying at length upon the ground, the saw frame is held uprightly with the saw upon the log, and the guide bar is permitted to descend against the side of the log. The machine being light in weight may be conveniently used for various purposes for sawing timber into suitable lengths.

Various features of the invention, relating more particularly to the engine, which may not be herein claimed, form the subjectmatter of a divisional application for Letters Patent, Serial Number 825,052, filed March 16, 1914.

Having thus described the invention, what is claimed as new is—

1. A portable sawing machine frame including a head stock, a tail stock, and two segmentally curved guiding frame members reversely arranged and connected to the head stock and the tail stock, the concave edge of each member facing the concave edge of the other, two wheels in the two stocks respectively, and two handles fixed on the two stocks respectively, the frame being adapted for carrying and controlling a chain saw to be movably guided by the wheels and the convex edges of the two members.

2. A sawing machine frame including a backing blade, a head stock and a tail stock secured to the blade, a bow-shaped guide bar secured to the head stock and the tail stock, a bow-shaped guard secured to the guide bar and extending over and covering the convex edge of the bar from the head stock to the tail stock, a driving wheel in the head stock, and a guide wheel in the tail stock, for carrying and controlling a chain saw with its back slidingly guided on the convex edge of the guide bar and the backing blade and extending about the wheels and under the bow-shaped guard.

3. A portable sawing machine frame comprising a guide bar curved on a segment of a circle, the convex portion of the bar forming a saw-guide, a tail stock removably secured to one end of the guide bar, and a curved guard connected to the bar and covering the saw-guide, the guard being movable longitudinally from the bar when the tail stock is removed from the bar.

4. A portable sawing machine frame comprising two separate curved guide bars having different radii and having each a convexly curved saw-guide on its outer side, one of the bars being longer circumferentially than the other, the bars being arranged with their concave sides facing each toward the other, a head stock secured to one end of both of the guide bars, and a tail stock secured to the opposite ends of both of the guide bars.

5. In a sawing machine, the combination of a curved guide bar having a convex guide face, two curved guard plates secured to opposite sides of the guide bar and extending to an arc beyond the curved guide face, the outer edge portions of the plates having ribs on the outer sides thereof respectively, a chain saw extending along said guide face between said plates, and a cap plate having inwardly curved clasping edges embracing said ribs, the cap plate extending over said saw.

6. In a portable sawing machine frame, the combination of two head stock parts connected together and having each an integral projection thereon that is set over toward the other projection, a curved guide bar having one end inserted between the projections and secured thereto, a tail stock secured to the opposite end of the guide bar, a backing blade secured to the head stock parts and to the tail stock, and a curved guard extending continuously from the projections of the head stock parts along the guide bar to the tail stock and secured to the guide bar.

7. In a portable sawing machine, the combination of two head stock parts connected together with space between them, each part having an aperture therein, a separate reinforcing member secured to the outer side of one of said parts and partially covering the aperture thereof, said member having a socket therein that is less in diameter than said aperture, two bearing boxes secured in said apertures respectively, one of said boxes extending to said reinforcing member, a hollow shaft rotatably mounted in said boxes and extending through one of the boxes, the outer end of the shaft having a driving wheel thereon, a sprocket wheel fixedly secured on the hollow shaft between said boxes, a crank shaft extending through said hollow shaft and into said socket and fixedly secured in the socket, and power means operatively connected with the crank shaft and the driving wheel for rotating the hollow shaft.

8. In a portable sawing machine, the combination of a saw-backing blade, a head stock connected to one end of the blade, two tail stock plates secured to the opposite end of the blade and having each a longitudinal slot in the end portion thereof, each plate having also end stops on its end portion extending inward at opposite sides of said slots, each of said plates having also a longitudinal guideway therein, a cross-bar connected to said plates at the inner ends of said slots, an axle slidingly arranged in said guideways, two yoke rods connected to the end portions respectively of the axle, an end bar fixed to the rods beyond the end stops, an adjusting rod screwed through said end bar and extending to said cross-bar, a nut on said adjusting rod, a spring seated on said end bar and on said nut, a guide wheel on said axle, a bow-shaped guide bar connected to the head stock and extending to said tail stock plates, two connecting rods secured to opposite sides of said guide bar and connected to said axle, and a driving wheel mounted in said head stock.

9. In a portable sawing machine, the combination of a head stock, a hollow shaft rotatably mounted in the head stock, a driving wheel in the head stock fixedly secured on the hollow shaft, a closed housing fixed on the hollow shaft on one side of the head stock, a crank shaft extending through the hollow shaft and having a crank arm thereon in the housing, the crank shaft being fixedly secured to the head stock, cylinders inclosed in and supported by said housing, each cylinder having a valve chest, pistons in the cylinders operatively connected with the crank shaft for rotating the housing, a header in said housing, and branch pipes connected with the header and the respective valve chests.

In testimony whereof, we affix our signatures in presence of two witnesses.

NELSON B. MITCHELL.
  JOHN W. TAGGART, Sr.
  ULRICH G. REDELMANN.

Witnesses:
 E. T. Silvius,
 Marie Wuelfing.